Aug. 4, 1931.  H. N. VAUGHAN  1,817,449
STOCK OILER
Original Filed Feb. 8, 1924   2 Sheets-Sheet 1
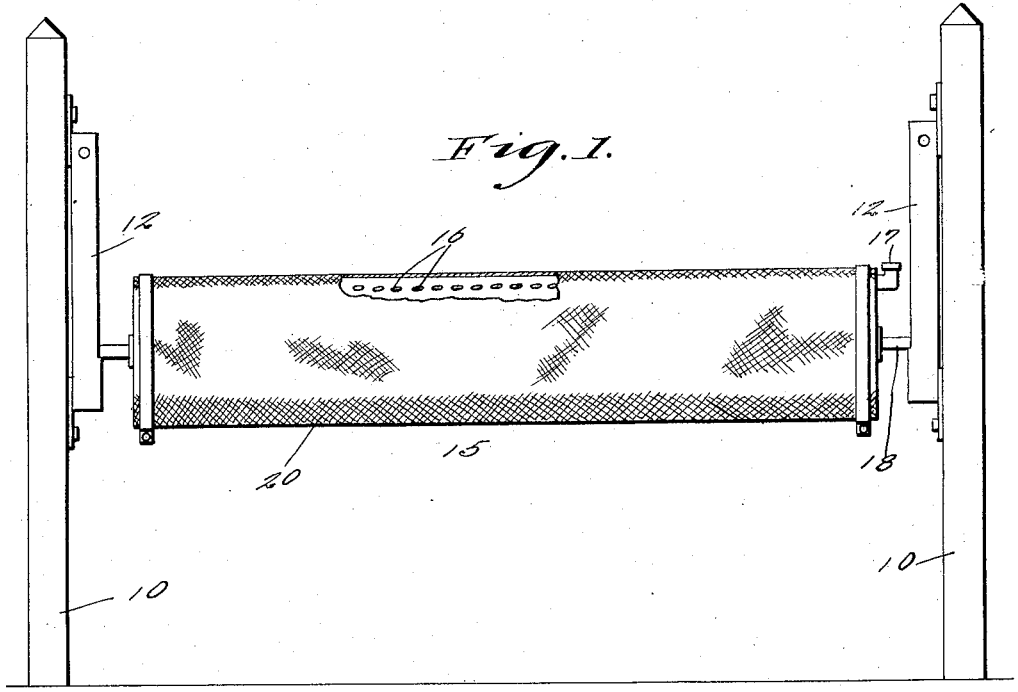
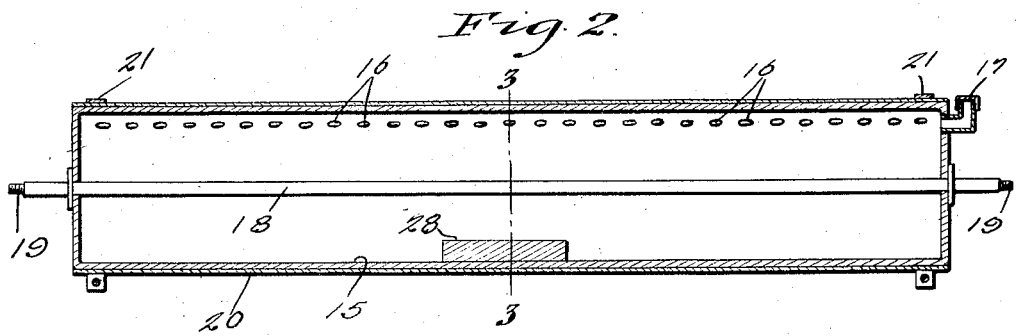
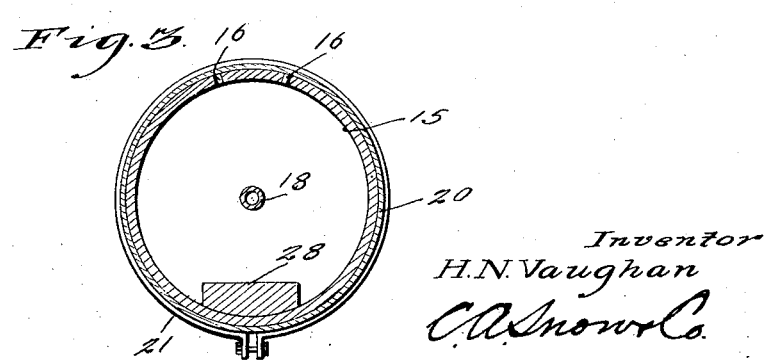
Witness
R. C. Thomas
Inventor
H. N. Vaughan
C. A. Snow Co.
Attorney

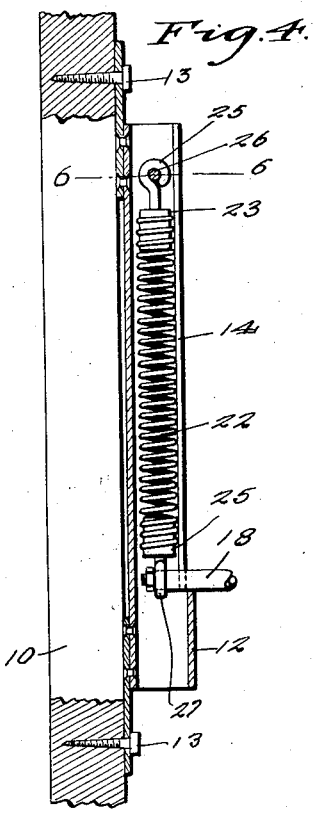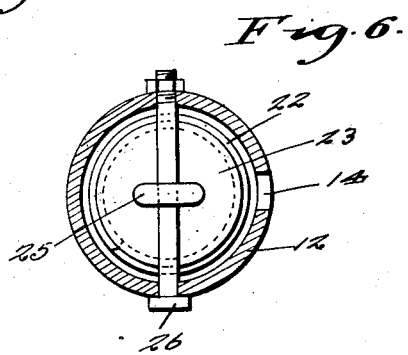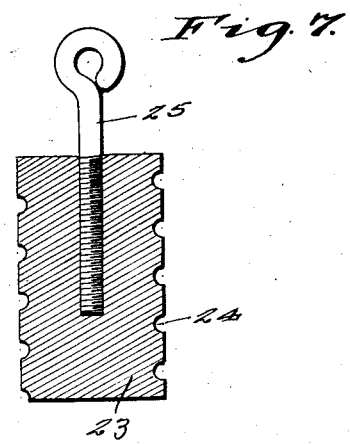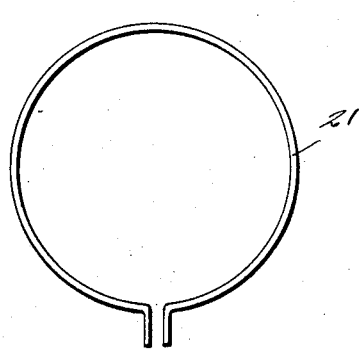

Patented Aug. 4, 1931

1,817,449

UNITED STATES PATENT OFFICE

HARRY N. VAUGHAN, OF VILLA PARK, ILLINOIS

STOCK OILER

Refiled for abandoned application Serial No. 691,445, filed February 8, 1924. This application filed January 17, 1930. Serial No. 421,563.

This invention relates to apparatus for applying insecticide and the like to stock, and has for its object the provision of a novel device by means of which stock such as horses, cattle, sheep, hogs and the like may oil themselves by rubbing against the device in the endeavor to allay itching or irritation caused by lice, or other vermin, mange or other diseases to which they may be subject.

It is well known that it is necessary to apply oil or some insecticide to live stock occasionally to eradicate vermin and to soothe irritation as otherwise the stock will not remain in healthy condition. I am aware of the fact that this has been accomplished in some instances by spraying and in other cases by driving the stock through vats containing the liquid. These ordinary and well known methods are not entirely satisfactory inasmuch as they require the services of one or more operators and are, furthermore, wasteful of the material and consequently expensive. It is with these facts in view that I have designed the present device which is so constructed and mounted that the animal will rub thereunder or against of their own accord to secure relief from itching or other irritation, the rubbing action causing oil or other insecticide to be automatically applied to the animals.

Another object is the provision of an apparatus of this character which is so constructed that it may be adjusted for use by animals of different sizes or kinds, it being obvious that a different height is necessary for horses compared with the height necessary for sheep or hogs.

An additional object is the provision of an oiler of this character which will be simple and inexpensive in manufacture, easy to take care of, economical in its use of insecticide, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is an elevation of my complete device,

Figure 2 is a longitudinal section through the oiling cylinder,

Figure 3 is a cross section through the barrel or cylinder on the line 3—3 of Figure 2, Figure 4 is a longitudinal section through one of the supporting members, Figure 5 is a detailed elevation of one of the supporting members, Figure 6 is a detail section on the line 6—6 of Figure 4, Figure 7 is a detail section through the spring adjusting member, Figure 8 is a detail view of the clamp for holding the fabric.

Referring more particularly to the drawings the numeral 10 designates a pair of upright posts which are designed to be driven into the ground or otherwise anchored so as to be rigid. If necessary the posts may be guyed though I have not illustrated such as it is obvious. Secured upon the confronting faces of the posts are elongated guides 12 which are preferably cylindrical in shape though they can of course be of any other desired cross sectional configuration. These guides are held to the posts by means of lag screws 13 or the like. These guides are formed with longitudinally extending slots 14 for a purpose to be described and have their ends open. The slots terminate short of the lower ends of the guides but extend clear to the top.

I also provide an elongated cylindrical barrel 15 which is closed at its ends and is provided throughout a portion of its area with perforations 16. At some convenient point this barrel is provided with a filling opening normally closed by a plug or cap 17, the opening being for the purpose of permitting filling of the barrel with oil or insecticide. Extending axially of the barrel is a shaft 18 which has its ends projecting therebeyond and formed with reduced threaded extensions 19. Surrounding the barrel is a wrapping 20 of burlap or other permeable material held in place by split ring clamps 21 or some equivalent means which will permit ready removal and replacement of the wrapping when such is desirable.

Located within the guides are coil springs 22 which have their ends threaded on to plugs 23 which have their peripheries formed with spiral grooves 24 which act as treads within which the convolutions of the springs engage. The upper plugs 23 carry hooks 25 threadedly engaged therein for adjusting purposes and held upon transverse bolts 26 which pass through the guides. The lower plugs 23 are equipped with hooks or eye bolts 27 within which are engaged the projecting ends of the shaft 18 so that the barrel or cylinder 15 will be rotatably supported. The springs are of the compression type and normally force the barrel downwardly, the ends of the shaft engaging the lower ends of the slots 14. Within the cylinder or barrel is a weight 28 for the purpose of holding it normally in such position that the perforations 16 will be uppermost and the liquid within the cylinder will not leak out.

In the use of the device it is of course apparent that the guides 12 must be secured upon the posts 10 at a height proper for the particular stock to be treated. For instance, if the stock to use the device should be horses, the guides would have to be located at quite a high point with respect to the ground, while for cattle, sheep or hogs, the guides would have to be located nearer the ground. Ordinarily the springs 12 hold the barrel at its lowermost position and this position should be such that the animal would have to squeeze under the device and consequently exert upward pressure thereon when passing beneath it. By experiment I have discovered that an animal afflicted with mange or infected with vermin will naturally rub under the cylinder in the endeavor to secure relief from the irritation or itching. As the animal squeezes under the barrel the same will be rotated and the impregnated covering will roll along and apply oil or whatever insecticide is used to the back of the animal. After the device has been in use for a short time, the animals will realize the relief to be obtained by rubbing under the cylinder and will therefore instinctively oil themselves at proper intervals so that they will be maintained in a healthy condition without the necessity for employing any of the elaborate and costly devices now used for this purpose.

While I have shown and described the preferred embodiment of the invention it is of course to be understood that I reserve the right to make such changes in the form, construction and arrangement of parts as will not depart from the spirit of the invention or the scope of the claim.

What is claimed is:

Apparatus of the class described including tubular guides for attachment to spaced supporting posts, each guide having a longitudinal slot extending thereinto from its upper end, a barrel for holding a treating liquid, there being apertures in the barrel, a wrapping of absorbent material mounted on the barrel and closing the opening, split ring clamps embracing the barrel for detachably securing the absorbent material to the barrel, a shaft extending axially through the barrel and having its end portions insertible downwardly into the slot in the guides, bearing members engaged by the ends of the shaft and insertible downwardly into the guides, springs attached at their lower ends to the bearing members, members connected to the upper ends of the springs, said members and the springs being insertible downwardly into the guides, and means for anchoring said members in the guides, thereby to hold the spring under compression to resist movement of the shaft toward the open ends of the slot in the guides.

In testimony that I claim the foregoing as my own, I have hereto affixed my signature.

HARRY N. VAUGHAN.